(12) United States Patent
Yang et al.

(10) Patent No.: US 10,571,586 B2
(45) Date of Patent: Feb. 25, 2020

(54) FALSE IMAGE REMOVAL IN REVERSE TIME MIGRATION

(71) Applicant: Saudi Arabian Oil Company, Dhahran (SA)

(72) Inventors: Jiarui Yang, Beijing (CN); Tong Wang Fei, Dhahran (SA); Yi Luo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 79 days.

(21) Appl. No.: 15/701,038

(22) Filed: Sep. 11, 2017

(65) Prior Publication Data

US 2019/0079206 A1    Mar. 14, 2019

(51) Int. Cl.
*G01V 1/36*    (2006.01)
*G01V 1/32*    (2006.01)
*G01V 1/28*    (2006.01)

(52) U.S. Cl.
CPC .............. *G01V 1/36* (2013.01); *G01V 1/282* (2013.01); *G01V 1/32* (2013.01); *G01V 2210/44* (2013.01); *G01V 2210/48* (2013.01); *G01V 2210/679* (2013.01)

(58) Field of Classification Search
CPC .... G01V 1/36; G01V 1/366–368; G01V 1/32; G01V 1/325; G01V 1/282; G01V 2210/679; G01V 2210/48; G01V 2210/44; G01V 2210/40
See application file for complete search history.

(56) References Cited

U.S. PATENT DOCUMENTS

| | | |
|---|---|---|
| 8,116,168 B1 | 2/2012 | Luo et al. |
| 2012/0051176 A1 | 3/2012 | Liu |
| 2014/0328140 A1 | 11/2014 | Khalil et al. |
| 2015/0124559 A1 | 5/2015 | Cha et al. |
| 2016/0341837 A1 | 11/2016 | Jing et al. |

OTHER PUBLICATIONS

Wang et al., RTM Artifact Removal Via a Fast Algorithm for Wavefield Decomposition, 2016 SEG International Exposition and 86th Annual Meeting, pp. 4690-4694 (Year: 2016).*

(Continued)

*Primary Examiner* — Toah M Le
(74) *Attorney, Agent, or Firm* — Fish & Richardson P.C.

(57) ABSTRACT

The present disclosure describes methods and systems, including computer-implemented methods, computer program products, and computer systems, for removing false image in reverse time migration (RTM). One computer-implemented method includes dividing volume of a source wavefield and a receiver wavefield into a plurality of windows, calculating a down-going component of the source wavefield and an up-going component of the receiver wavefield for each window in the plurality of windows and at a particular value of time, calculating a down-going component of the source wavefield at the particular value of time by summing the down-going component of the source wavefield in each window of the plurality of windows, and calculating an up-going component of the receiver wavefield at the particular value of time by summing the up-going component of the receiver wavefield in each window of the plurality of windows.

16 Claims, 5 Drawing Sheets

(56) References Cited

OTHER PUBLICATIONS

Fei et al., "An Endemic Problem in Reverse-Time Migration," 84th Annual International Meeting, SEG, Expanded Abstracts, Published in 2014, pp. 3811-3815.
Fei et al., "Removing False Images in Reverse-Time Migration: the Concept of De-Primary," Geophysics, 80, No. 6, Nov.-Dec. 2015, pp. S237-S244.
Fletcher, "Suppressing Unwanted Internal Reflections in Prestack Reverse-Time Migration," Geophysics, 71, No. 6, Nov.-Dec. 2006, pp. E79-E82.
Liu et al., "An Effective Imaging Condition for Reverse-Time Migration using Wavefield Decomposition," Geophysics, vol. 76, No. 1, Jan. 2011, pp. S29-S39.
Liu et al., "Reverse-Time Migration using One-Way Wavefield Imaging Condition," 77th Annual International Meeting, SEG Expanded Abstracts, published in 2007, pp. 2170-2174.
Hu et al., "Angle gathers from reverse time migration using analytic wavefield propagation and decomposition in the time domain," Geophysics vol. 81, No. 1, Jan. 1, 2016, 9 pages.
Kim et al., "3D Least-Squares Reverse Time Migration Using Wavefield Decomposition via Hilbert transform," 79th EAGE Conference & Exhibition, Jun. 12, 2017, 5 pages.
International Search Report and Written Opinion issued in International Application No. PCT/US2018/049834 dated Dec. 20, 2018, 17 pages.

* cited by examiner

100

```
┌─────────────────────────────────────────────────────────────────────┐
│ Divide volume of a wavefield into multiple overlapping windows.     │
│ Within a window, the background velocity for RTM is approximately   │
│ homogenous.                                                         │
└─────────────────────────────────────────────────────────────────────┘
                                    ↓
┌─────────────────────────────────────────────────────────────────────┐
│ For each window, do local spatial Fourier transform to $S(\vec{x},t_i)$, $S'(\vec{x},t_i)$, $R(\vec{x},t_i)$, │
│ and $R'(\vec{x},t_i)$, and get $\hat{S}(\vec{k},t_i)$, $\hat{S}'(\vec{k},t_i)$, $\hat{R}(\vec{k},t_i)$, and $\hat{R}'(\vec{k},t_i)$, respectively. │
└─────────────────────────────────────────────────────────────────────┘
```

Take out the $k_z > 0$ part for $\hat{S}(\vec{k},t_i)$ and $\hat{S}'(\vec{k},t_i)$, and take out $k_z < 0$ part for $\hat{R}(\vec{k},t_i)$ and $\hat{R}'(\vec{k},t_i)$. That is:

$$\hat{S}_+(\vec{k},t_i) = \begin{cases} \hat{S}(\vec{k},t_i), k_z > 0 \\ 0, k_z \leq 0 \end{cases}, \quad \hat{S}'_+(\vec{k},t_i) = \begin{cases} \hat{S}'(\vec{k},t_i), k_z > 0 \\ 0, k_z \leq 0 \end{cases}.$$

$$\hat{R}_-(\vec{k},t_i) = \begin{cases} \hat{R}(\vec{k},t_i), k_z < 0 \\ 0, k_z \geq 0 \end{cases}, \quad \hat{R}'_-(\vec{k},t_i) = \begin{cases} \hat{R}'(\vec{k},t_i), k_z < 0 \\ 0, k_z \geq 0 \end{cases}.$$

Calculate $\widehat{HS}_+(\vec{k},t_i) = \frac{\hat{S}'_+(\vec{k},t_i)}{j(V|\vec{k}|+\varepsilon)}$ and $\widehat{HR}_-(\vec{k},t_i) = \frac{\hat{R}'_-(\vec{k},t_i)}{j(V|\vec{k}|+\varepsilon)}$. $V$ is the average velocity inside the window, $|\vec{k}| = \sqrt{k_x^2 + k_y^2 + k_z^2}$ is the norm of the wavenumber vector, $\varepsilon$ is a user given small quantity to avoid zero divisor and $j$ is the imaginary unit.

Calculate $\hat{S}_{D+}(\vec{k},t_i) = \hat{S}_+(\vec{k},t_i) + \widehat{HS}_+(\vec{k},t_i)$, $\hat{R}_{U-}(\vec{k},t_i) = \hat{R}_-(\vec{k},t_i) + \widehat{HR}_-(\vec{k},t_i)$.

Do inverse spatial Fourier transform to $\hat{S}_{D+}(\vec{k},t_i)$, $\hat{R}_{U-}(\vec{k},t_i)$, and get $S_{D+}(\vec{x},t_i)$, $R_{U-}(\vec{x},t_i)$, respectively. And down-going wavefield for source $S_D(\vec{x},t_i) = Re(S_{D+}(\vec{x},t_i))$ while up-going $R_U(\vec{x},t_i) = Re(R_{U-}(\vec{x},t_i))$.

Sum all the window-results of $S_D(\vec{x},t_i)$ and $R_U(\vec{x},t_i)$ with tapering in overlapping area, thus getting the whole down-going wavefield for source and up-going for receiver.

FALSE IMAGE REMOVAL IN REVERSE TIME MIGRATION

TECHNICAL FIELD

This disclosure relates to seismic data processing and, more specifically, to false image removal in reverse time migration.

BACKGROUND

High resolution depth images of earth subsurface layers are important for reservoir exploration, delineation, and development. Wave equation based seismic depth migration techniques, such as reverse time migration (RTM), are suitable techniques for seismic depth imaging in the oil industry, especially in complex environments such as subsalt exploration. However, imaging noise exists in RTM due to unwanted cross-correlation of source and receiver wavefields at nonreflecting points along a raypath.

SUMMARY

The present disclosure describes methods and systems, including computer-implemented methods, computer program products, and computer systems for removing false image in reverse time migration (RTM). One computer-implemented method includes dividing volume of a source wavefield and a receiver wavefield into a plurality of windows, calculating a down-going component of the source wavefield and an up-going component of the receiver wavefield for each window in the plurality of windows and at a particular value of time, the down-going component of the source wavefield being a real component of inverse Fourier transformation of a sum of a positive component of Fourier transformation of the source wavefield and Hilbert transformation of the positive component of the Fourier transformation of the source wavefield, the up-going component of the receiver wavefield being a real component of inverse Fourier transformation of a sum of a negative component of Fourier transformation of the receiver wavefield and Hilbert transformation of the negative component of the Fourier transformation of the receiver wavefield, calculating a down-going component of the source wavefield at the particular value of time by summing the down-going component of the source wavefield in each window of the plurality of windows, and calculating an up-going component of the receiver wavefield at the particular value of time by summing the up-going component of the receiver wavefield in each window of the plurality of windows.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, comprising, calculating a positive component of Fourier transformation of time-derivative of the source wavefield and calculating a negative component of Fourier transformation of time-derivative of the receiver wavefield.

A second aspect, combinable with any of the previous aspects, wherein the plurality of windows is a plurality of overlapping windows.

A third aspect, combinable with any of the previous aspects, wherein summing the down-going component of the source wavefield and summing the up-going component of the receiver wavefield in each window comprises summing the down-going component of the source wavefield and summing the up-going component of the receiver wavefield in each window with tapering in overlapping area.

A fourth aspect, combinable with any of the previous aspects, wherein the Fourier transformation is 1D spatial Fourier transformation.

A fifth aspect, combinable with any of the previous aspects, comprising, calculating an image term based on the down-going component of the source wavefield and the up-going component of the receiver wavefield at the particular value of time.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an example method for calculating a down-going component of a source wavefield and an up-going component of a receiver wavefield, according to some implementations.

Like reference numbers and designations in the various drawings indicate like elements.

DETAILED DESCRIPTION

The following detailed description describes removing false image introduced by reverse time migration (RTM) image condition applied on source and receiver wavefields with erroneous propagation direction combinations and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

High resolution depth images of earth subsurface layers are important for successful reservoir exploration, delineation, and development. Wave equation based seismic depth migration techniques, such as RTM, are suitable techniques for seismic depth imaging in the oil industry, especially in complex environments such as subsalt exploration. However, imaging noise exists in RTM due to unwanted cross-correlation of source and receiver wavefields, at nonreflecting points along a raypath.

In RTM, the image $I(\vec{x})$ is obtained by applying a conventional image condition:

$$I(\vec{x}) = \int_0^{T_{max}} S(\vec{x},t) R(\vec{x},t) dt \quad (1)$$

where $S(\vec{x},t)$ is a source wavefield, $R(\vec{x},t)$ is a receiver wavefield, $\vec{x}=(x,y,z)$ represents a position vector, and t represents time and ranges between 0 and $T_{max}$ (e.g., the maximum recording time). In general, the image $I(\vec{x})$ can be decomposed, according to Liu et al., 2007, into four components:

$$I(\vec{x}) = I_{du}(\vec{x}) + I_{dd}(\vec{x}) + I_{uu}(\vec{x}) + I_{ud}(\vec{x}) \quad (2)$$

where $I_{du}$ is the cross correlation of the down-going source and up-going receiver wavefields, $I_{dd}$ is the cross correlation of the down-going source and down-going receiver wavefields, $I_{uu}$ is the cross correlation of the up-going source and up-going receiver wavefields, and $I_{ud}$ is the cross correlation of the up-going source and down-going receiver wavefields. In addition, the four components are expressed as:

$$I_{du}(\vec{x}) = \int_0^{T_{max}} S_d(\vec{x},t) R_u(\vec{x},t) dt \quad (3)$$

$$I_{dd}(\vec{x}) = \int_0^{T_{max}} S_d(\vec{x},t) R_d(\vec{x},t) dt \quad (4)$$

$$I_{uu}(\vec{x}) = \int_0^{T_{max}} S_u(\vec{x},t) R_u(\vec{x},t) dt \quad (5)$$

$$I_{ud}(\vec{x}) = \int_0^{T_{max}} S_u(\vec{x},t) R_d(\vec{x},t) dt \quad (6)$$

where $S_d(\vec{x},t)$ and $R_d(\vec{x},t)$ are the down-going components of the source and receiver wavefields, respectively, and $S_u(\vec{x},t)$ and $R_u(\vec{x},t)$ are the up-going components of the source and receiver wavefields, respectively.

The low-frequency imaging noises in RTM can be suppressed by eliminating the $I_{dd}(\vec{x})$ and $I_{ud}(\vec{x})$ components from the image $I(\vec{x})$. To calculate the remaining image $I_{du}(\vec{x}) + I_{ud}(\vec{x})$, a Hilbert transform may be applied to the wavefields along depth coordinate z, and the image integration-combinations can be calculated afterwards. The $I_{ud}(\vec{x})$ component can also form a false image and needs to be eliminated. As a result, only the $I_{du}(\vec{x})$ component is kept in the image $I(\vec{x})$ in order to remove false image in RTM. To keep the $I_{du}(\vec{x})$ component only, at least one of the source wavefield or receiver wavefield is split into down-going and up-going components. Therefore, Hilbert transform previously described may not produce the image $I_{du}(\vec{x})$.

One way to split a wavefield into down-going and up-going components is to perform the split in a frequency-wavenumber domain. For example, the source wavefield $S(\vec{x},t)$ can be transformed (e.g., via 2D Fourier transform) to the $\hat{S}(\vec{k},\omega)$, where $\omega$ denotes frequency and $\vec{k}=(k_x,k_y,k_z)$ denotes a wavenumber vector. The down-going component in $(\vec{k},\omega)$ domain is the part with $\omega k_z>0$, while the up-going component in $(\vec{k},\omega)$ domain is the part with $\omega k_z<0$. However, in practical implementation of RTM, the wavefield is typically calculated by the finite-difference method, and due to the large data amount, only a few time-slices of the wavefield can be stored. Therefore, Fourier transform of the wavefield from time t to frequency $\omega$, or Hilbert transform to pick the positive/negative $\omega$ part cannot be performed.

At a high level, the described approach provides an approximation method to split a wavefield into down-going and up-going components. The described approximation method splits a wavefield into down-going and up-going components with, for example, only the knowledge of the current time-slice and the current time-derivative slice of the wavefield. The current time-slice and the current time-derivative slice of the wavefield can be acquired from the finite-difference forward modeling of the wavefield in RTM. Based on this splitting, the image $I_{du}(\vec{x})$ can be calculated and the false image produced by wrong component combinations (e.g., $I_{dd}(\vec{x})$, $I_{uu}(\vec{x})$, $I_{ud}(\vec{x})$) can be eliminated from $I(\vec{x})$ to enhance the final image of RTM. As a result, the final image of RMT can be used, for example, to better estimate properties of earth subsurface layers for oil and gas exploration.

FIG. 1 illustrates an example method 100 for calculating a down-going component of a source wavefield and an up-going component of a receiver wavefield, according to some implementations. For example, based on RTM forward modeling, a time-slice of the source wavefield $S(\vec{x},t)$, at $t=t_i$, is $S(\vec{x},t_i)$, and a time-slice of the receiver wavefield $R(\vec{x},t)$, at $t=t_i$, is $R(\vec{x},t_i)$. In addition, a time-derivative slice of the source wavefield $S(\vec{x},t)$ and a time-derivative slice of the receiver wavefield $R(\vec{x},t)$, at $t=t_i$, can be obtained as:

$$S'(\vec{x},t_i) = \frac{dS(\vec{x},t)}{dt}\bigg|_{t=t_i} \quad (7)$$

$$R'(\vec{x},t_i) = \frac{dR(\vec{x},t)}{dt}\bigg|_{t=t_i} \quad (8)$$

With a time-slice and a time-derivative slice of a wavefield, the wavefield can be split into down-going and up-going components by the workflow shown in FIG. 1.

As illustrated in FIG. 1, the example method 100 starts with dividing the volume of a wavefield (e.g., the source wavefield and/or the receiver wavefield) into multiple overlapping windows. The window, for example, can be defined in a 3D space and provides a confined 3D sub-volume. In each dimension in the 3D space, the window is half-overlapped with an adjacent window. In general, the window size can be, for example, one-tenth of its dimension size. In the present disclosure, the velocity of media within a window is assumed to be approximately homogeneous, and the dispersion relation of the wavefield for all wavenumber vector $\vec{k}$ is:

$$\omega = \pm C|\vec{k}| = \pm V\sqrt{k_x^2+k_y^2+k_z^2} \quad (9)$$

where V is the average velocity of media inside the window, and $\omega$ is the circular frequency.

For each window in the multiple overlapping windows, local spatial Fourier transform (e.g., 1D Fourier transform) is applied to the time-slice of the source wavefield (i.e., $S(\vec{x},t_i)$), the time-derivative slice of the source wavefield (i.e., $S'(\vec{x},t_i)$), the time-slice of the receiver wavefield (i.e., $R(\vec{x},t_i)$), and the time-derivative slice of the receiver wavefield (i.e., $R'(\vec{x},t_i)$). The resulting Fourier transformations are $\hat{S}(\vec{k},t_i)$, $\hat{S}'(\vec{k},t_i)$, $\hat{R}(\vec{k},t_i)$, and $\hat{R}'(\vec{k},t_i)$, respectively. The $k_z>0$ parts for $\hat{S}(\vec{k},t_i)$ and $\hat{S}'(\vec{k},t_i)$, and the $k_z<0$ parts for $\hat{R}(\vec{k},t_i)$, and $\hat{R}'(\vec{k},t_i)$, can be obtained as:

$$\hat{S}_+(\vec{k}, t_i) = \begin{cases} \hat{S}(\vec{k}, t_i), k_z > 0 \\ 0, k_z \leq 0 \end{cases} \quad (10)$$

$$\hat{S}'_+(\vec{k}, t_i) = \begin{cases} \hat{S}'(\vec{k}, t_i), k_z > 0 \\ 0, k_z \leq 0 \end{cases} \quad (11)$$

$$\hat{R}_-(\vec{k}, t_i) = \begin{cases} \hat{R}(\vec{k}, t_i), k_z < 0 \\ 0, k_z \geq 0 \end{cases} \quad (12)$$

$$\hat{R}'_-(\vec{k}, t_i) = \begin{cases} \hat{R}'(\vec{k}, t_i), k_z < 0 \\ 0, k_z \geq 0 \end{cases} \quad (13)$$

If $\vec{k}$ corresponds to, for example, only two circular frequencies, one positive and one negative as shown in Equation (9), $\hat{S}_+(\vec{k},t_0)$, in Equation (10) can be decomposed into two terms as:

$$\hat{S}_+(\vec{k}, t_i) = \hat{S}_{+(\omega=V\sqrt{k_x^2+k_y^2+k_z^2})}(\vec{k}, t_i) + \hat{S}_{+(\omega=-V\sqrt{k_x^2+k_y^2+k_z^2})}(\vec{k}, t_i) \quad (14)$$

Based on the property of the Fourier transform, the following can be obtained:

$$\hat{S}'_+(\vec{k}, t_i) = jV\sqrt{k_x^2 + k_y^2 + k_z^2} \quad (15)$$
$$\left(\hat{S}_{+(\omega=V\sqrt{k_x^2+k_y^2+k_z^2})}(\vec{k}, t_i) - \hat{S}_{+(\omega=-V\sqrt{k_x^2+k_y^2+k_z^2})}(\vec{k}, t_i)\right)$$

where j is an imaginary unit. Similarly, $\hat{R}_-(\vec{k},t_i)$ in Equation (12) can also be decomposed into two terms as:

$$\hat{R}_-(\vec{k}, t_i) = \hat{R}_{-(\omega=V\sqrt{k_x^2+k_y^2+k_z^2})}(\vec{k}, t_i) + \hat{R}_{-(\omega=-V\sqrt{k_x^2+k_y^2+k_z^2})}(\vec{k}, t_i) \quad (16)$$

Based on the property of the Fourier transform, the following can be obtained:

$$\hat{R}'_-(\vec{k}, t_i) = jV\sqrt{k_x^2 + k_y^2 + k_z^2} \quad (17)$$
$$\left(\hat{R}_{-(\omega=V\sqrt{k_x^2+k_y^2+k_z^2})}(\vec{k}, t_i) - \hat{R}_{-(\omega=-V\sqrt{k_x^2+k_y^2+k_z^2})}(\vec{k}, t_i)\right)$$

From Equations (15) and (17), the Hilbert transformations of $\hat{S}_+(\vec{k},t_i)$ and $\hat{R}_-(\vec{k},t_i)$ can be derived approximately as:

$$\hat{HS}_+(\vec{k}, t_i) \cong \frac{\hat{S}'_+(\vec{k}, t_i)}{j(V|\vec{k}|+\varepsilon)} \cong \quad (18)$$
$$\hat{S}_{+(\omega=V\sqrt{k_x^2+k_y^2+k_z^2})}(\vec{k}, t_i) - \hat{S}_{+(\omega=-V\sqrt{k_x^2+k_y^2+k_z^2})}(\vec{k}, t_i)$$

$$\hat{HR}_-(\vec{k}, t_i) \cong \frac{\hat{R}'_-(\vec{k}, t_i)}{j(V|\vec{k}|+\varepsilon)} \cong \quad (19)$$
$$\hat{R}_{-(\omega=V\sqrt{k_x^2+k_y^2+k_z^2})}(\vec{k}, t_i) - \hat{R}_{-(\omega=-V\sqrt{k_x^2+k_y^2+k_z^2})}(\vec{k}, t_i)$$

where $|\vec{k}|=\sqrt{k_x^2+k_y^2+k_z^2}$ is the norm of the wavenumber vector $\vec{k}$, and $\varepsilon$ is a user specified small number chosen to avoid dividing zero in the equations. For example, the value of $\varepsilon$ can be 0.0001 or smaller.

From Equations (14) and (18), the following (i.e., the component with $k_z>0$ and $\omega>0$) can be obtained:

$$\hat{S}_{D+}(\vec{k}, t_i) = \hat{S}_+(\vec{k}, t_i) + \hat{HS}_+(\vec{k}, t_i) = 2\hat{S}_{+(\omega=V\sqrt{k_x^2+k_y^2+k_z^2})}(\vec{k}, t_i) \quad (20)$$

By the conjugate properties of Fourier transform, the down-going source wavefield for the particular window can be obtained:

$$S_D(\vec{x},t_i)=\mathrm{Re}(\mathrm{IFFT}(\hat{S}_{D+}(\vec{k},t_i))) \quad (21)$$

where IFFT( ) is the inverse spatial Fourier transform from $\vec{k}$ to $\vec{x}$, and Re( ) is a function that returns real part.

Similarly, from Equations (16) and (19), the following (i.e., the component with $k_z<0$ and $\omega<0$) can be obtained:

$$\hat{R}_{U-}(\vec{k}, t_i) = \hat{R}_-(\vec{k}, t_i) + \hat{HR}_-(\vec{k}, t_i) = 2\hat{R}_{-(\omega=V\sqrt{k_x^2+k_y^2+k_z^2})}(\vec{k}, t_i) \quad (22)$$

By the conjugate properties of Fourier transform, the up-going receiver wavefield for the particular window can be obtained:

$$R_U(\vec{x},t_i)=\mathrm{Re}(\mathrm{IFFT}(\hat{R}_{U-}(\vec{k},t_i))) \quad (23)$$

To obtain the whole down-going source wavefield $S_d(\vec{x},t_i)$, all the window results of $S_D(\vec{x},t_i)$ (e.g., calculated via Equation (21) for every window in the multiple overlapping windows) are summed. Similarly, to obtain the whole up-going receiver wavefield $R_u(\vec{x},t_i)$, all the window results of $R_U(\vec{x},t_i)$ (e.g., calculated via Equation (23) for every window in the multiple overlapping windows) are summed. As discussed above, FIG. 1 provides an approximation method of calculating a down-going component of a source wavefield and an up-going component of a receiver wavefield. As shown in Equations (18 to 20) and (22), the key in splitting a wavefield with only a time slice of the wavefield and a time-derivative slice of the wavefield is to select the $\omega>0$ and/or $\omega<0$ component without, in some implementations, using Fourier transform in the time domain.

Figure 2:
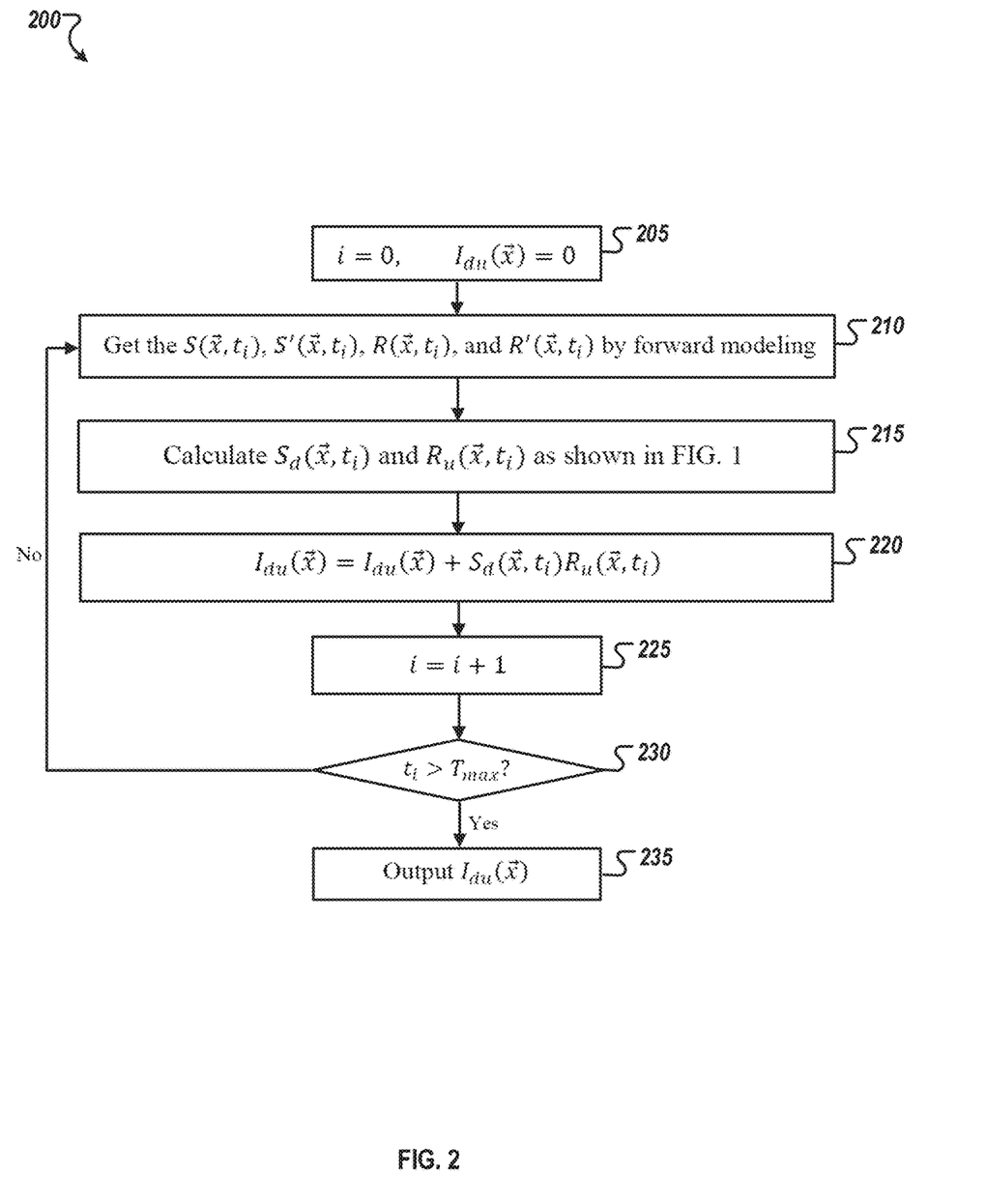
FIG. 2 illustrates an example method for calculating an image based on a down-going component of a source wavefield and an up-going component of a receiver wavefield, according to some implementations.

FIG. 2 illustrates an example method 200 for calculating an image based on a down-going component of a source wavefield and an up-going component of a receiver wavefield, according to some implementations. For example, the example method 200 starts at block 205 where i and the image $I_{du}(\vec{x})$ are both initialized to 0. At block 210, time-slices of source and receiver wavefields at time $t_i$ are obtained from the source and receiver wavefields (i.e., $S(\vec{x},t)$ and $R(\vec{x},t)$). In addition, time-derivative slices of the source and receiver wavefields at time $t_i$ are also obtained (e.g., via Equations (7) and (8)). At block 215, the whole down-going source wavefield (i.e., $S_d(\vec{x},t_i)$) and the whole up-going receiver wavefield (i.e., $R_u(\vec{x},t_i)$) can be calculated using the approximation method described in FIG. 1. At block 220, $S(\vec{x},t)R(\vec{x},t)$ is added to the image $I_{du}(\vec{x})$. At block 225, i is increased by 1. At block 230, it is determined whether $t_i$ is greater than $T_{max}$. $T_{max}$ is, for example, the maximum recording time of the source and receiver wavefields. If $t_i$ is not greater than $T_{max}$, then the method proceeds to block 210. If $t_i$ is greater than $T_{max}$, then the final image $I_{du}(\vec{x})$ is outputted at block 235. Although this disclosure refers to the method in FIG. 2 for purposes of example, the subject matter of this document can use other methods to calculate the image $I_{du}(\vec{x})$ based on the down-going source wavefield and up-going receiver wavefield calculated using the approximation method described in FIG. 1.

Figure 3:
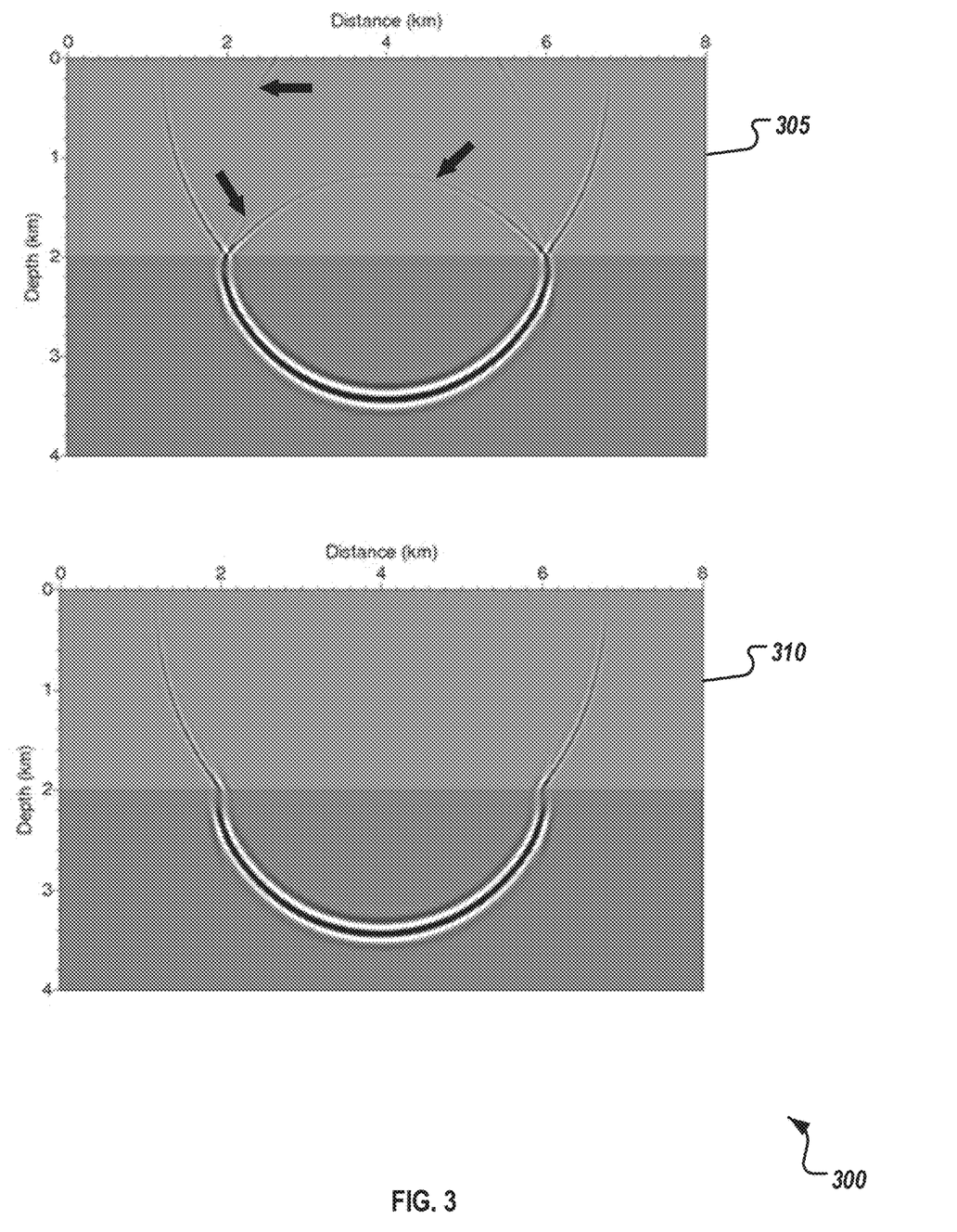
FIG. 3 illustrates example images before and after removing false image in reverse time migration (RTM), according to some implementations.

FIG. 3 illustrates example images 300 before and after removing false image in reverse time migration (RTM), according to some implementations. In FIG. 3, the RTM impulse response result 305 using the method proposed by Liu et. al., 2007 is shown on the top. The result 305 shows migration noise (e.g., generated from $I_{dd}(\vec{x})$ and $I_{uu}(\vec{x})$) and false image (e.g., generated from $I_{ud}(\vec{x})$) pointed by three arrows. The result 310 using the described approximation method is shown on the bottom of FIG. 3. The result 310 shows the removal of the migration noise and the false image.

Figure 4:
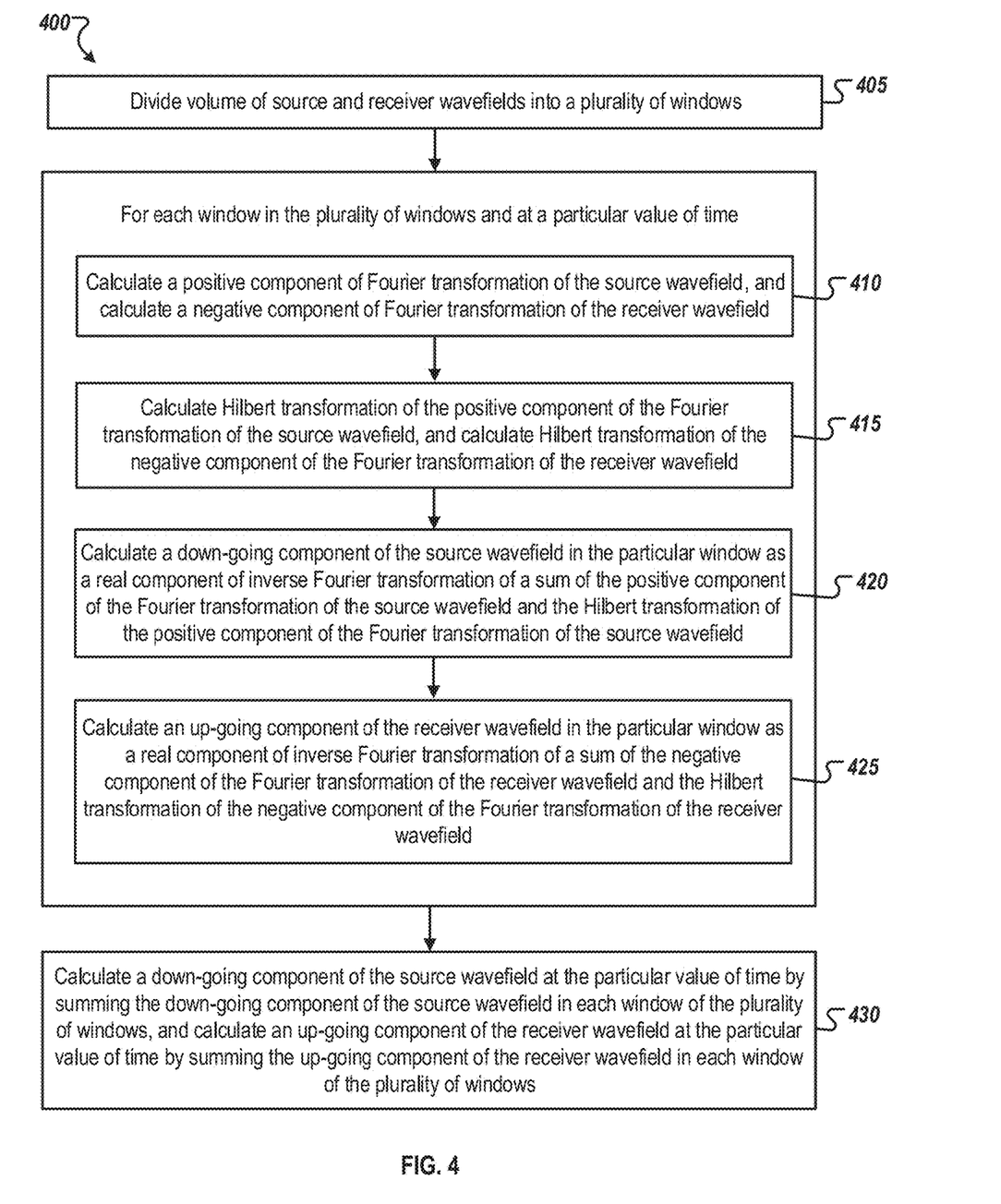
FIG. 4 is a flowchart illustrating an example method for calculating a down-going component of a source wavefield and an up-going component of a receiver wavefield, according to some implementations.

FIG. 4 is a flowchart illustrating an example method 400 for calculating a down-going component of a source wavefield and an up-going component of a receiver wavefield, according to some implementations. For clarity of presentation, the description that follows generally describes method 400 in the context of the other figures in this description. For example, method 400 can be performed by a computer system described in FIG. 5. However, it will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

The method 400 starts at block 405 where volume of a source wavefield and a receiver wavefield is divided into multiple windows. In some implementations, the multiple windows are multiple overlapping windows. For each window in the multiple windows and at a particular value of time (e.g., $t_i$ between 0 and $T_{max}$), the following operations (i.e., block 410 to block 425) are performed.

At block 410, a positive component of Fourier transformation of the source wavefield (e.g., Equation (10)) and a negative component of Fourier transformation of the receiver wavefield (e.g., Equation (12)) are calculated. In some implementations, the Fourier transformation is 1D spatial Fourier transformation not performed in the time domain. In some implementations, the positive component is the part where $k_z > 0$ and the negative component is the part where $k_z < 0$.

At block 415, Hilbert transformation of the positive component of the Fourier transformation of the source wavefield and Hilbert transformation of the negative component of the Fourier transformation of the receiver wavefield are calculated. In some implementations, the Hilbert transformation of the positive component of the Fourier transformation of the source wavefield is calculated based on a positive component of Fourier transformation of time-derivative of the source wavefield (e.g., Equation (18)). In some implementations, the Hilbert transformation of the negative component of the Fourier transformation of the receiver wavefield is calculated based on a negative component of Fourier transformation of time-derivative of the receiver wavefield (e.g., Equation (19)).

At block 420, a down-going component of the source wavefield in the particular window (e.g., $S_D(\vec{x},t_i)$) is calculated. In some implementations, a sum of the positive component of the Fourier transformation of the source wavefield and the Hilbert transformation of the positive component of the Fourier transformation of the source wavefield is calculated first (e.g., Equation (20)). Next, inverse Fourier transformation is applied to the sum. Then, the down-going component of the source wavefield in the particular window is calculated as a real component of the inverse Fourier transformation of the sum (e.g., Equation (21)).

At block 425, an up-going component of the receiver wavefield in the particular window (e.g., $R_U(\vec{x},t_i)$) is calculated. In some implementations, a sum of the negative component of the Fourier transformation of the receiver wavefield and the Hilbert transformation of the negative component of the Fourier transformation of the receiver wavefield is calculated first (e.g., Equation (22)). Next, inverse Fourier transformation is applied to the sum. Then, the up-going component of the receiver wavefield in the particular window is calculated as a real component of the inverse Fourier transformation of the sum (e.g., Equation (23)).

At block 430, a down-going component of the source wavefield and an up-going component of the receiver wavefield at the particular value of time (e.g., $S_d(\vec{x},t_i)$ and $R_u(\vec{x},t_i)$) are calculated. The down-going component of the source wavefield at the particular value of time is calculated by summing the down-going component of the source wavefield (e.g., calculated in Equation (21)) in each window of the multiple windows. The up-going component of the receiver wavefield at the particular value of time is calculated by summing the up-going component of the receiver wavefield (e.g., calculated in Equation (23)) in each window of the multiple windows. In some implementations, the down-going component of the source wavefield in each window of the multiple windows is summed with tapering in the overlapping area. In some implementations, the up-going component of the receiver wavefield in each window of the multiple windows is summed with tapering in the overlapping area.

The example method 400 shown in FIG. 4 can be modified or reconfigured to include additional, fewer, or different steps (not shown in FIG. 4), which can be performed in the order shown or in a different order. For example, after block 430, an image (e.g., $I_{du}(\vec{x})$) can be calculated based on the down-going component of the source wavefield and the up-going component of the receiver wavefield at the particular value of time. In some implementations, one or more of the steps shown in FIG. 4 can be repeated or iterated, for example, until a terminating condition is reached. In some implementations, one or more of the individual steps shown in FIG. 4 can be executed as multiple separate steps, or one or more subsets of the steps shown in FIG. 4 can be combined and executed as a single step. In some implementations, one or more of the individual steps shown in FIG. 4 may also be omitted from the example method 400.

Figure 5:
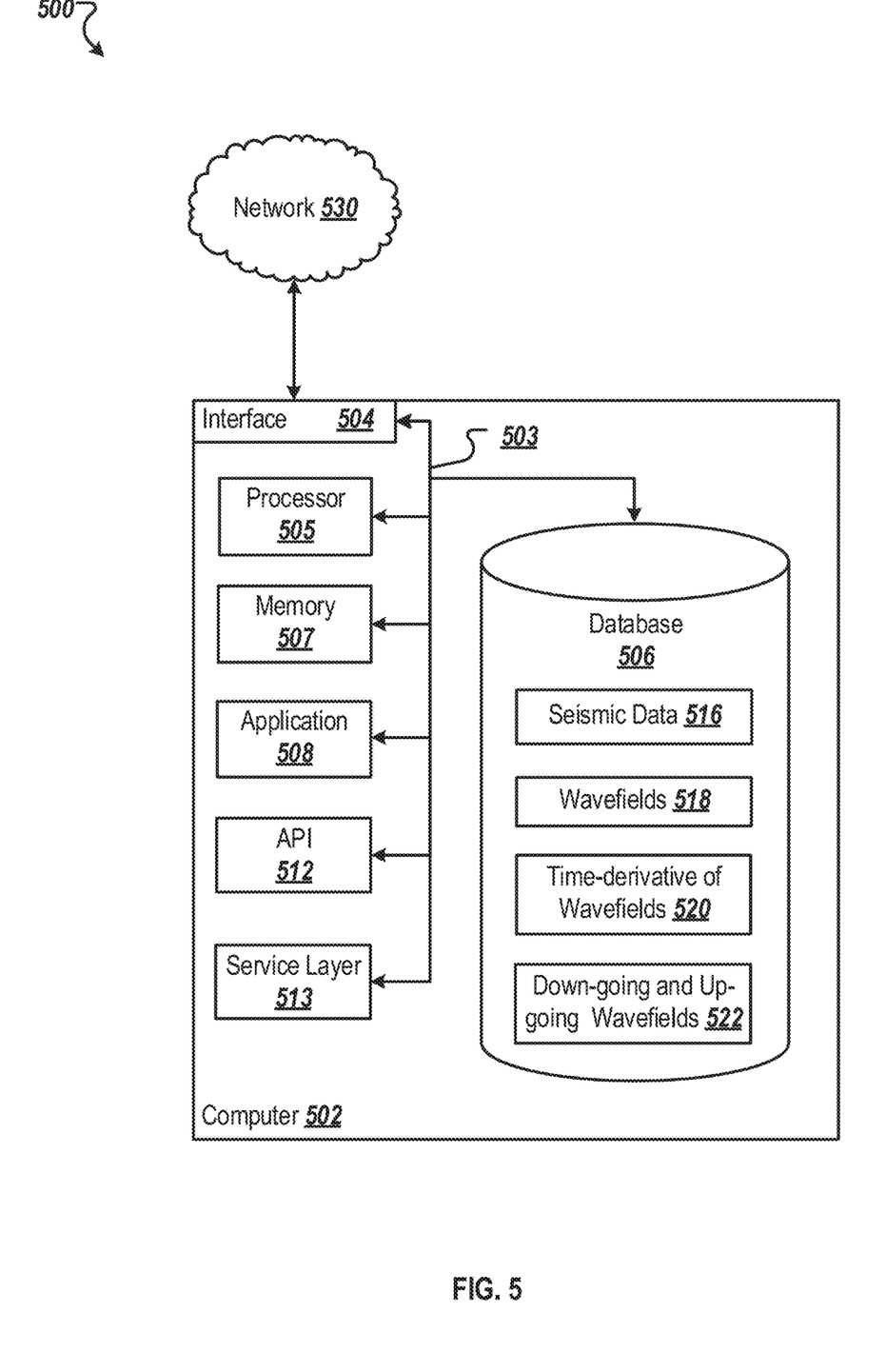
FIG. 5 is a block diagram illustrating an example computer system used to provide computational functionalities associated with described algorithms, methods, functions, processes, flows, and procedures as described in the instant disclosure, according to some implementations.

FIG. 5 is a block diagram of an example computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer) and respond to the received requests by processing the received requests using the appropriate software application(s). In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and may refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module, without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems that are connected to the network 530 (whether illustrated or not) in a distributed environment. Generally, the interface 504 comprises logic encoded in software or hardware (or a combination of software and hardware) and is operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds seismic data 516, source and receiver wavefields 518, time-derivative slices of the source and receiver wavefields 520, and down-going source and up-going receiver wavefields 522.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like, storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or a combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, or applications. Further, although illustrated as a single application 508, the application 508 may be implemented as multiple applications 508 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client", "user", and other appropriate terminology may be used interchangeably, as appropriate, without departing from the scope of this disclosure. Moreover, this disclosure contemplates that many users may use one computer 502, or that one user may use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

REFERENCES

Faqi Liu, Guanquan Zhang, Scott A. Morton and Jacques P. Leveille, 2011, An effective imaging condition for reverse-time migration using wavefield decomposition: Geophysics, vol. 76, no. 1, S29S39.

Faqi Liu, Guanquan Zhang, Scott A. Morton, Jacques P. Leveille, 2007, Reverse-time migration using one-way wavefield imaging condition: 77th Annual International Meeting, SEG Expanded Abstracts.

Tong W. Fei, Yi Luo and Fuhao Qin, 2014, An endemic problem in reverse-time migration: 84th Annual International Meeting, SEG Expanded Abstracts.

The invention claimed is:

1. A method comprising:

dividing, by one or more hardware processors, volume of a source wavefield $S(\vec{x}, t)$ and a receiver wavefield $R(\vec{x}, t)$ into a plurality of windows, wherein $\vec{x}=(x, y, z)$ represents a position vector and t represents time;

for each window in the plurality of windows and at a particular value of time $t=t_i$:

calculating, by the one or more hardware processors, $\hat{S}_+(\vec{k}, t_i)$, a positive component of Fourier transformation of the source wavefield, wherein $\vec{k}=(k_x, k_y, k_z)$ represents a wavenumber vector, wherein $$\hat{S}'_+(\vec{k}, t_i) = \begin{cases} \hat{S}'(\vec{k}, t_i), k_z > 0 \\ 0, k_z \leq 0 \end{cases},$$

and wherein $\hat{S}(\vec{k}, t_i)$ is the Fourier transformation of the source wavefield;

calculating, by the one or more hardware processors, $$\hat{S}'_+(\vec{k}, t_i) = \begin{cases} \hat{S}'(\vec{k}, t_i), k_z > 0 \\ 0, k_z \leq 0 \end{cases},$$

a positive component of Fourier transformation of time-derivative of the source wavefield, wherein $\hat{S}'(\vec{k}, t_i)$ is the Fourier transformation of time-derivative of the source wavefield:

calculating, by the one or more hardware processors, $\widehat{HS}_+(\vec{k}, t_i)$, Hilbert transformation of the positive component of the Fourier transformation of the source wavefield;

calculating, by the one or more hardware processors, $S_D(\vec{x}, t_i)$, a down-going component of the source wavefield in the particular window as a real component of inverse Fourier transformation of a sum of the $\hat{S}_+(\vec{k}, t_i)$ and the $\widehat{HS}_+(\vec{k}, t_i)$;

calculating, by the one or more hardware processors, $\hat{R}_-(\vec{k}, t_i)$, a negative component of Fourier transformation of the receiver wavefield, wherein $$\hat{R}'_-(\vec{k}, t_i) = \begin{cases} \hat{R}'(\vec{k}, t_i), k_z < 0 \\ 0, k_z \geq 0 \end{cases},$$

and wherein $\hat{R}(\vec{k}, t_i)$ is the Fourier transformation of the receiver wavefield;

calculating, b the one or more hardware processors, $$\hat{R}'_-(\vec{k}, t_i) = \begin{cases} \hat{R}'(\vec{k}, t_i), k_z < 0 \\ 0, k_z \geq 0 \end{cases},$$

a negative component of Fourier transformation of time-derivative of the receiver wavefield, wherein $\hat{R}'(\vec{k}, t_i)$ is the Fourier transformation of time-derivative of the receiver wavefield:

calculating, by the one or more hardware processors, $\widehat{HR}_-(\vec{k}, t_i)$, Hilbert transformation of the negative component of the Fourier transformation of the receiver wavefield; and calculating, by the one or more hardware processors, $R_U(\vec{x}, t_i)$, an up-going component of the receiver wavefield in the particular window as a real component of inverse Fourier transformation of a sum of the $\hat{R}_-(\vec{k}, t_i)$ and the $\widehat{HR}_-(\vec{k}, t_i)$;

calculating, by the one or more hardware processors, $S_d(\hat{x}, t_i)$, a down-going component of the source wavefield at the particular value of time by summing the down-going component of the source wavefield in each window of the plurality of windows;

calculating, by the one or more hardware processors, $R_u(\vec{x}, t_i)$, an up-going component of the receiver wavefield at the particular value of time by summing the up-going component of the receiver wavefield in each window of the plurality of windows; and generating, by the one or more hardware processors, an image based on the calculated $S_d(\vec{x}, t_i)$ and $R_u(\vec{x}, t_i)$ to remove false image in reverse time migration (RTM).

2. The method of claim 1, wherein $$\widehat{HS}_+(\vec{k}, t_i) = \frac{\hat{S}'_+(\vec{k}, t_i)}{j(V|\vec{k}|+\varepsilon)} \text{ and } \widehat{HR}_-(\vec{k}, t_i) = \frac{\hat{R}'_+(\vec{k}, t_i)}{j(V|\vec{k}|+\varepsilon)},$$

and wherein V is an average velocity in the particular window, $|\vec{k}|=\sqrt{k_x^2+k_y^2+k_z^2}$ norm of the wavenumber vector, ε is a user specified number, and j is an imaginary unit.

3. The method of claim 2, wherein $S_D(\vec{x}, t_i)=\text{Re}(\text{IFFT}(\hat{S}_+(\vec{k}, t_i)+ \widehat{HS}_+(\vec{k}, t_i)))$ and $R_U(\vec{x}, t_i)=\text{Re}(\text{IFFT}(\hat{R}_-(\vec{k}, t_i)+ \widehat{HR}_-(\vec{k}, t_i)))$.

4. The method of claim 1, wherein the plurality of windows is a plurality of overlapping windows.

5. The method of claim 4, wherein summing the down-going component of the source wavefield and summing the up-going component of the receiver wavefield in each window comprises summing $S_D(\vec{x}, t_i)$ and $R_U(\vec{x}, t_i)$ in each window w with tapering in overlapping area.

6. The method of claim 1, wherein the Fourier transformation is 1D spatial Fourier transformation.

7. The method of claim 1, further comprising:
calculating an image term $I_{du}(\vec{x})$ based on the $S_d(\vec{x}, t_i)$ and the $R_u(\vec{x}, t_i)$.

8. A device comprising:
a memory; and
one or more hardware processors that are arranged to perform operations including:
dividing volume of a source wavefield $S(\vec{x}, t)$ and a receiver wavefield $R(\vec{x}, t)$ into a plurality of windows, wherein $\vec{x}=(x, y, z)$ represents a position vector and t represents time;
for each window in the plurality of windows and at a particular value of time $t=t_i$:
calculating $\hat{S}_+(\vec{k}, t_i)$, a positive component of Fourier transformation of the source wavefield, wherein $\vec{k}=(k_x, k_y, k_z)$ represents a wavenumber vector, wherein $$\hat{S}'_+(\vec{k}, t_i) = \begin{cases} \hat{S}'(\vec{k}, t_i), k_z > 0 \\ 0, k_z \leq 0 \end{cases},$$

and wherein $\hat{S}(\vec{k}, t_i)$ is the Fourier transformation of the source wavefield;
calculating $$\hat{S}'_+(\vec{k}, t_i) = \begin{cases} \hat{S}'(\vec{k}, t_i), k_z > 0 \\ 0, k_z \leq 0 \end{cases},$$

a positive component of Fourier transformation of time-derivative of the source wavefield, wherein $\hat{S}'(\vec{k},t_i)$ is the Fourier transformation of time-derivative of the source wavefield:
calculating $\widehat{HR}_+(\vec{k}, t_i)$, Hilbert transformation of the positive component of the Fourier transformation of the source wavefield;
calculating $S_D(\vec{x}, t_i)$, a down-going component of the source wavefield in the particular window as a real component of inverse Fourier transformation of a sum of the $\hat{S}_+(\vec{k}, t_i)$ and the $\widehat{HS}_+(\vec{k}, t_i)$;

calculating $\hat{R}_-(\vec{k}, t_i)$, a negative component of Fourier transformation of the receiver wavefield, wherein $$\hat{R}'_-(\vec{k}, t_i) = \begin{cases} \hat{R}'(\vec{k}, t_i), k_z < 0 \\ 0, k_z \geq 0 \end{cases},$$

and wherein $\hat{R}(\vec{k}, t_i)$ is the Fourier transformation of the receiver wavefield;
calculating $$\hat{R}'_-(\vec{k}, t_i) = \begin{cases} \hat{R}'(\vec{k}, t_i), k_z < 0 \\ 0, k_z \geq 0 \end{cases},$$

a negative component of Fourier transformation of time-derivative of the receiver wavefield, wherein $\hat{R}'(\vec{k},t_i)$ is the Fourier transformation of time-derivative of the receiver wavefield:
calculating $\widehat{HR}_-(\vec{k}, t_i)$, Hilbert transformation of the negative component of the Fourier transformation of the receiver wavefield; and
calculating $R_U(\vec{x}, t_i)$, an up-going component of the receiver wavefield in the particular window as a real component of inverse Fourier transformation of a sum of the $\hat{R}_-(\vec{k}, t_i)$ and the $\widehat{HR}_-(\vec{k}, t_i)$;
calculating $S_d(\vec{x}, t_i)$, a down-going component of the source wavefield at the particular value of time by summing the down-going component of the source wavefield in each window of the plurality of windows;
calculating $R_u(\vec{x}, t_i)$, an up-going component of the receiver wavefield at the particular value of time by summing the up-going component of the receiver wavefield in each window of the plurality of windows; and
generating an image based on the calculated $S_d(\vec{x}, t_i)$ and $R_u(\vec{x}, t_i)$ to remove false image in reverse time migration (RTM).

9. The device of claim 8, wherein $$\widehat{HS}_+(\vec{k}, t_i) = \frac{\hat{S}'_+(\vec{k}, t_i)}{j(V|\vec{k}|+\varepsilon)} \text{ and } \widehat{HR}_-(\vec{k}, t_i) = \frac{\hat{R}'_-(\vec{k}, t_i)}{j(V|\vec{k}|+\varepsilon)},$$

and wherein V is an average velocity in the particular window, $|\vec{k}|=\sqrt{k_x^2+k_y^2+k_z^2}$ is norm of the wavenumber vector, E is a user specified number, and j is an imaginary unit.

10. The device of claim 9, wherein $S_D(\vec{x}, t_i)=\text{Re}(\text{IFFT}(\hat{S}_+(\vec{k}, t_i)+ \widehat{HS}_+(\vec{k}, t_i)))$ and $R_U(\vec{x}, t_i)=\text{Re}(\text{IFFT}(\hat{R}_-(\vec{k}, t_i)+ \widehat{HR}_-(\vec{k}, t_i)))$.

11. The device of claim 8, wherein the plurality of windows is a plurality of overlapping windows.

12. The device of claim 11, wherein summing the down-going component of the source wavefield and summing the up-going component of the receiver wavefield in each window comprises summing $S_D(\vec{x}, t_i)$ and $R_U(\vec{x}, t_i)$ in each window w with tapering in overlapping area.

13. The device of claim 8, wherein the Fourier transformation is 1D spatial Fourier transformation.

14. The device of claim 8, the operations further comprising:
calculating an image term $I_{du}(\vec{x})$ based on the $S_d(\vec{x}, t_i)$ and the $R_u(\vec{x}, t_i)$.

15. A non-transitory computer-readable medium storing instructions executable by a computer system to perform operations comprising:
dividing volume of a source wavefield $S(\vec{x}, t)$ and a receiver wavefield $R(\vec{x}, t)$ into a plurality of windows, wherein $\vec{x}=(x, y, z)$ represents a position vector and t represents time;
for each window in the plurality of windows and at a particular value of time $t=t_i$:
calculating $\hat{S}_+(\vec{k}, t_i)$, a positive component of Fourier transformation of the source wavefield, wherein $\vec{k}=(k_x, k_y, k_z)$ represents a wavenumber vector, wherein $$\hat{S}_+(\vec{k}, t_i) = \begin{cases} \hat{S}'(\vec{k}, t_i), k_z > 0 \\ 0, k_z \leq 0 \end{cases},$$

and wherein $\hat{S}(\vec{k}, t_i)$ is the Fourier transformation of the source wavefield;
calculating $$\hat{S}'_+(\vec{k}, t_i) = \begin{cases} \hat{S}'(\vec{k}, t_i), k_z > 0 \\ 0, k_z \leq 0 \end{cases},$$

a positive component of Fourier transformation of time-derivative of the source wavefield, wherein $\hat{S}'(\vec{k}, t_i)$ is the Fourier transformation of time-derivative of the source wavefield;
calculating $\widehat{HS}_+(\vec{k}, t_i)$, Hilbert transformation of the positive component of the Fourier transformation of the source wavefield;
calculating $S_D(\vec{x}, t_i)$, a down-going component of the source wavefield in the particular window as a real component of inverse Fourier transformation of a sum of the $\hat{S}_+(\vec{k}, t_i)$ and the $\widehat{HS}_+(\vec{k}, t_i)$;
calculating $\hat{R}_-(\vec{k}, t_i)$, a negative component of Fourier transformation of the receiver wavefield, wherein $$\hat{R}_-(\vec{k}, t_i) = \begin{cases} \hat{R}'(\vec{k}, t_i), k_z < 0 \\ 0, k_z \geq 0 \end{cases},$$

and wherein $\hat{R}'(\vec{k}, t_i)$ is the Fourier transformation of the receiver wavefield;
calculating $$\hat{R}'_-(\vec{k}, t_i) = \begin{cases} \hat{R}'(\vec{k}, t_i), k_z < 0 \\ 0, k_z \geq 0 \end{cases},$$

a negative component of Fourier transformation of time-derivative of the receiver wavefield, wherein $\hat{R}'(\vec{k}, t_i)$ is the Fourier transformation of time-derivative of the receiver wavefield;
calculating $\widehat{HR}_-(\vec{k}, t_i)$, Hilbert transformation of the negative component of the Fourier transformation of the receiver wavefield; and
calculating $R_U(\vec{x}, t_i)$, an up-going component of the receiver wavefield in the particular window as a real component of inverse Fourier transformation of a sum of the $\hat{R}_-(\vec{k}, t_i)$ and the $\widehat{HR}_-(\vec{k}, t_i)$;
calculating $S_d(\vec{x}, t_i)$, a down-going component of the source wavefield at the particular value of time by summing the down-going component of the source wavefield in each window of the plurality of windows;
calculating $R_u(\vec{x}, t_i)$, an up-going component of the receiver wavefield at the particular value of time by summing the up-going component of the receiver wavefield in each window of the plurality of windows; and
generating an image based on the calculated $S_d(\vec{x}, t_i)$ and $R_u(\vec{x}, t_i)$ to remove false image in reverse time migration (RTM).

16. The medium of claim 15, wherein the plurality of windows is a plurality of overlapping windows.

* * * * *

UNITED STATES PATENT AND TRADEMARK OFFICE
CERTIFICATE OF CORRECTION

Page 1 of 3

PATENT NO. : 10,571,586 B2
APPLICATION NO. : 15/701038
DATED : February 25, 2020
INVENTOR(S) : Jiarui Yang, Tong Wang Fei and Yi Luo It is certified that error appears in the above-identified patent and that said Letters Patent is hereby corrected as shown below:

On the Title Page

Column 2 (Primary Examiner), Line 1, delete "Toah M Le" and insert -- Toan M Le --;

In the Claims

Column 15, Lines 51-52 (approx.), Claim 1, delete "$\hat{S}_+(\vec{k}, t_i) = \begin{cases} \hat{S}(\vec{k}, t_i), k_z > 0 \\ 0, k_z \leq 0 \end{cases}$"

and insert -- $\hat{S}'_+(\vec{k}, t_i) = \begin{cases} \hat{S}'(\vec{k}, t_i), k_z > 0 \\ 0, k_z \leq 0 \end{cases}$ --;

Column 15, Line 67, Claim 1, delete "wavefield:" and insert -- wavefield; --;

Column 16, Lines 18-19 (approx.), Claim 1, delete "$\hat{R}_-(\vec{k}, t_i) = \begin{cases} \hat{R}(\vec{k}, t_i), k_z < 0 \\ 0, k_z \geq 0 \end{cases}$"

and insert -- $\hat{R}'_-(\vec{k}, t_i) = \begin{cases} \hat{R}'(\vec{k}, t_i), k_z < 0 \\ 0, k_z \geq 0 \end{cases}$ --;

Signed and Sealed this
Fourth Day of August, 2020

Andrei Iancu
*Director of the United States Patent and Trademark Office*

CERTIFICATE OF CORRECTION (continued)
U.S. Pat. No. 10,571,586 B2

Column 16 Line 23 (approx.), Claim 1, delete "$\hat{R}(\vec{k}, t_i)$," and insert -- $\hat{R}(\vec{k}, t_i)$ --;

Column 16, Line 24 (approx.), Claim 1, delete "b" and insert -- by --;

Column 16, Line 34 (approx.), Claim 1, delete "wavefield:" and insert -- wavefield; --;

Column 16, Line 63 (approx.), Claim 2, delete "$\widehat{R'}_{+}(\vec{k}, t_i)$" and insert -- $\widehat{R'}_{-}(\vec{k}, t_i)$ --;

Column 17, Line 2, Claim 2, before "norm" insert -- is --;

Column 17, Line 5, Claim 3, delete "Re(IFFT(+" and insert -- Re(IFFT --;

Column 17, Lines 42-43 (approx.), Claim 8, delete "$\hat{S'}_{+}(\vec{k}, t_i) = \begin{cases} \hat{S'}(\vec{k}, t_i), k_z > 0 \\ 0, k_z \leq 0 \end{cases}$" and insert -- $\hat{S}_{+}(\vec{k}, t_i) = \begin{cases} \hat{S}(\vec{k}, t_i), k_z > 0 \\ 0, k_z \leq 0 \end{cases}$ --;

Column 17, Line 58 (approx.), Claim 8, delete "wavefield:" and insert -- wavefield; --;

Column 17, Line 59 (approx.), Claim 8, delete "$\widehat{HR}_{+}(\vec{k}, t_i)$," and insert -- $\widehat{HS}_{+}(\vec{k}, t_i)$, --;

CERTIFICATE OF CORRECTION (continued)

U.S. Pat. No. 10,571,586 B2

Column 18, Lines 7-8 (approx.), Claim 8, delete "$\hat{R}'_{-}(\vec{k},t_i) = \begin{cases} \hat{R}'(\vec{k},t_i), k_z < 0 \\ 0, k_z \geq 0 \end{cases}$"

and insert -- $\hat{R}_{-}(\vec{k},t_i) = \begin{cases} \hat{R}(\vec{k},t_i), k_z < 0 \\ 0, k_z \geq 0 \end{cases}$ --;

Column 18, Line 23 (approx.), Claim 8, delete "wavefieid:" and insert -- wavefield; --;

Column 18, Line 56 (approx.), Claim 9, delete "E" and insert -- $\varepsilon$ --;

Column 19, Lines 27-28 (approx.), Claim 15, delete "$\hat{S}'_{+}(\vec{k},t_i) = \begin{cases} \hat{S}'(\vec{k},t_i), k_z > 0 \\ 0, k_z \leq 0 \end{cases}$"

and insert -- $\hat{S}_{+}(\vec{k},t_i) = \begin{cases} \hat{S}(\vec{k},t_i), k_z > 0 \\ 0, k_z \leq 0 \end{cases}$ --;

Column 20, Lines 8-9 (approx.), Claim 15, delete "$\hat{R}'_{-}(\vec{k},t_i) = \begin{cases} \hat{R}'(\vec{k},t_i), k_z < 0 \\ 0, k_z \geq 0 \end{cases}$"

and insert -- $\hat{R}_{-}(\vec{k},t_i) = \begin{cases} \hat{R}(\vec{k},t_i), k_z < 0 \\ 0, k_z \geq 0 \end{cases}$ --;

Column 20, Line 12 (approx.), Claim 15, delete "$\hat{R}'(\vec{k},t_i)$" and insert -- $\hat{R}(\vec{k},t_i)$ --;

Column 20, Line 45, Claim 15, delete "$R_U(\vec{x},t_i)$" and insert -- $R_U(\vec{x},t_i)$ --.